UNITED STATES PATENT OFFICE.

THOMAS ALVA EDISON, OF LLEWELLYN PARK, NEW JERSEY, ASSIGNOR TO EDISON STORAGE BATTERY COMPANY, OF WEST ORANGE, NEW JERSEY, A CORPORATION OF NEW JERSEY.

PROCESS OF TREATING ALKALINE STORAGE BATTERIES.

No. 821,625.  Specification of Letters Patent.  Patented May 29, 1906.

Application filed November 5, 1904. Serial No. 231,496.

*To all whom it may concern:*

Be it known that I, THOMAS ALVA EDISON, a citizen of the United States, residing at Llewellyn Park, Orange, county of Essex, and State of New Jersey, have invented certain new and useful Improvements in Processes of Treating Alkaline Storage Batteries, of which the following is a specification.

In the manufacture of my improved iron-nickel storage battery I find that acid radicals, carbonates, organic matter, and other soluble impurities become lodged in the active masses, due to various causes, such as impurities in the chemicals used, carelessness in handling, the employment of impure water, &c. While these soluble impurities appear to have little or no deleterious effect on the iron or negative mass, they are highly objectionable when present in the nickel or depolarizing mass and tend to effect a gradual reduction in the capacity of the latter. The presence of these impurities in the negative mass is, however, objectionable, as they are likely to pass over to the nickel mass to contaminate the latter. Furthermore, the same or substantially similar impurities frequently get into my improved batteries after continued use, owing generally to the employment of impure water, and result in reducing the capacity of the nickel mass. In order to remove these soluble impurities from the active masses, I carry on a process which consists, generally speaking, of subjecting the active masses to treatment in a hot caustic solution with the concurrent generation of large quantities of hydrogen gas *in situ* within the active masses, the heating being effected, preferably electrically, by passing a discharging current through the active masses. Obviously this treatment may be applied to the nickel mass alone, since it is there that the objection indicated is most seriously experienced; but it is preferable that the treatment should also extend to the iron or negative mass, for the reason that, as stated, the impurities therefrom are likely to find their way into the nickel mass to deleteriously affect the same. By the treatment explained the soluble impurities will be driven out into the solution, which is then poured off and a fresh alkaline solution introduced.

In carrying the method into effect I first take as many of the cells as may be desired to treat and connect the iron and nickel electrodes in each cell in opposition to the nickel-plated can or receptacle thereof in such a way that the two electrodes shall act as cathodes and the nickel-plated receptacle as an insoluble anode. A number of batteries may be thus connected in series to correspond with the pressure of the discharging-current used. I now pass a reverse charge through the circuit so that the two electrodes of each cell, acting as cathodes, will give off hydrogen, which reverse charge will be continued for from ten to thirty hours at the regular rate of charge usually used. This action results in the generation of heat, whereby the solution will be raised to and maintained at a temperature somewhat below the boiling-point. To conserve the energy as much as possible, the cells are preferably covered with asbestos or some other material conducting heat slowly. Obviously the first result of the reversing current is to completely discharge the active masses; but when the latter are completely discharged they act as insoluble cathodes in which hydrogen is developed. In the case of a nickel mass, however, the complete reduction thereof renders the particles non-conducting, so that the evolution of hydrogen takes place from the surfaces of the graphite flakes, which are intimately mixed with the mass of nickel hydroxid. This treatment results in the elimination of the soluble impurities which pass out into the solution and are removed by the pouring off of the latter. Apparently the effect is not electrolytic, but I believe is due to the dissolving of the impurities in the hot caustic solution, facilitated by the mechanical action of the hydrogen bubbles in escaping through the active masses. After the treatment described the solution is poured off, a fresh solution is introduced, the electrodes are connected up in the regular way, and are given a twenty-four hour charge at the normal rate. Obviously the carrying out of my process as above described depends upon the fact that the cans or receptacles of my storage batteries present surfaces of metallic nickel which will be unaffected by electrolytic action in alkaline solution and on which surfaces oxygen will be developed. This makes the carrying out of the method a very simple matter. If, however, the cans or receptacles are made of some insoluble insulating material or are completely lined with such material, separate anodes may be employed and may be formed of plates of nickel or graphite or other suitable material, which may be introduced into the receptacle when the reverse charging operation takes place, or, instead, the electrodes may be connected up in opposition to any suitable insoluble electrode outside of the can or receptacle and then subjected to the treatment described.

It will of course be understood that the process may be carried out in connection with the nickel mass alone, in which case the iron electrode will be disconnected from the circuit and the reverse current will be applied only to the nickel electrode. If it is found after continued use that a battery falls off in capacity, due to the presence of these soluble impurities in the nickel mass, the method described may be carried out in connection therewith, including the treatment of both active masses or of the nickel mass alone. When this is done, it will be found that the cells will recover substantially their original capacity, the recovery, in fact, being within a very small percentage of the original capacity.

Having now fully described my invention, what I claim as new therein, and desire to secure by Letters Patent, is—

1. The process of eliminating soluble impurities from storage batteries employing depolarizing masses of nickel-oxygen compounds, which consists in opposing the nickel mass to a suitable anode in an alkaline solution, in then passing a reverse current through the nickel mass to generate hydrogen therein, and result in the heating of the solution, whereby the soluble impurities will be driven off into the solution, and finally, in pouring off the solution, substantially as set forth.

2. The process of eliminating soluble impurities from alkaline storage batteries employing active masses of oxygen compounds of nickel and iron respectively, which consists in opposing both active masses as cathodes to a suitable anode in an alkaline solution, and in then passing a reverse current through the same to heat the solution and generate hydrogen gas in the active masses to thereby force the impurities therefrom into the solution, and in finally, removing the solution, substantially as set forth.

3. The process of removing soluble impurities from the depolarizing mass of an alkaline storage battery, which consists in connecting the positive electrode thereof in circuit with an inactive conducting surface in an alkaline solution, in passing a reverse current between the two, whereby the solution will be heated and hydrogen gas developed in the active mass, and in finally, pouring off the solution, substantially as set forth.

4. The process of removing soluble impurities from the active masses of an alkaline storage battery, which consists in connecting the two electrodes as cathodes in circuit with an inactive conducting anode in an alkaline solution, in passing a reverse current between the two, whereby the solution will be heated and hydrogen gas will be developed in the active masses, and in finally, pouring off the solution, substantially as set forth.

5. The process of removing soluble impurities from alkaline storage batteries, employing conducting-receptacles of an insoluble metal, which consists in connecting the depolarizing mass as a cathode in circuit with the conducting-receptacle in an alkaline solution, in passing a reverse current between the two to heat the solution and generate hydrogen gas in the active mass, and in finally pouring off the solution, substantially as set forth.

6. The process of removing soluble impurities from the active masses of an alkaline storage battery employing conducting receptacles of an insoluble metal, which consists in connecting the two electrodes as cathodes in circuit with the conducting-receptacle as an anode in an alkaline solution, in passing a reverse current between the two to heat the solution and generate hydrogen gas in the active masses and finally, in pouring off the solution, substantially as set forth.

7. The process of removing soluble impurities from alkaline storage batteries, employing conducting-receptacles of an insoluble metal, which consists in insulating the receptacles to reduce the dissipation of heat, in connecting the positive mass in circuit with the conducting-receptacle in an alkaline solution, in passing a reverse current between the two to heat the solution and generate hydrogen gas in the active masses and in finally, pouring off the solution, substantially as set forth.

8. The process of removing soluble impurities from the active masses of an alkaline storage battery employing a conducting-receptacle of insoluble metal, which consists in insulating the receptacle to reduce the dissipation of heat, in connecting the two negative masses as cathodes in circuit with the conducting-receptacle as an anode in an alkaline solution, in passing a reverse current between the two to heat the solution and generate hydrogen gas in the active masses, and in finally, pouring off the solution, substantially as set forth.

This specification signed and witnessed this 29th day of October, 1904.

THOMAS ALVA EDISON.

Witnesses:
 FRANK L. DYER,
 J. W. AYLSWORTH.